(12) United States Patent
Xiao et al.

(10) Patent No.: US 12,456,071 B2
(45) Date of Patent: Oct. 28, 2025

(54) ARTIFICIAL INTELLIGENCE BASED APPLICATION MODERNIZATION ADVISORY

(71) Applicant: International Business Machines Corporation, Armonk, NY (US)

(72) Inventors: Jin Xiao, White Plains, NY (US); Anup Kalia, White Plains, NY (US); Raghav Batta, Ossining, NY (US); Hongtan Sun, Armonk, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1097 days.

(21) Appl. No.: 17/087,663

(22) Filed: Nov. 3, 2020

(65) Prior Publication Data
US 2022/0138617 A1    May 5, 2022

(51) Int. Cl.
*G06F 9/455*    (2018.01)
*G06F 3/06*    (2006.01)
(Continued)

(52) U.S. Cl.
CPC ........... *G06N 20/00* (2019.01); *G06F 3/0604* (2013.01); *G06F 8/65* (2013.01); *G06F 9/455* (2013.01);
(Continued)

(58) Field of Classification Search
None
See application file for complete search history.

(56) References Cited

U.S. PATENT DOCUMENTS

| 7,467,375 B2 | 12/2008 | Tondreau |
| 7,519,814 B2 | 4/2009 | Rochette |

(Continued)

FOREIGN PATENT DOCUMENTS

| CN | 108920250 A | 11/2018 |
| CN | 110603522 A | 12/2019 |

(Continued)

OTHER PUBLICATIONS

"Patents Act 1977: Examination Report under Section 18(3)", Intellectual Property Office, Your Reference: DP/P49699GB, Application No. GB2114739.2, Oct. 13, 2022, 8 pgs.
(Continued)

*Primary Examiner* — Abu Zar Ghaffari
(74) *Attorney, Agent, or Firm* — Amin, Turocy & Watson, LLP (57) ABSTRACT

Technology for applying artificial intelligence to decide when to, and/or when not to, send a consumer of a computer system a communication recommending that the computer system be revised to include a more recent version of at least one of the following: a hardware component (for example, microprocessor(s)) and/or a software component (for example, an updated version of an app). The computer system, that is subject to modernization, may be owned outright by the consumer, or it may be purchased as a service (for example, infrastructure as a service, software as a service, package of cloud services). Some embodiments focus on modernization recommendations specifically tailored to cloud orchestration software that deploys containers.

19 Claims, 5 Drawing Sheets

(51) Int. Cl.
    *G06F 8/65*         (2018.01)
    *G06F 9/50*         (2006.01)
    *G06N 5/022*       (2023.01)
    *G06N 5/04*         (2023.01)
    *G06N 20/00*       (2019.01)
    *G06F 9/451*       (2018.01)
    *G06Q 10/10*       (2023.01)

(52) U.S. Cl.
    CPC ...... *G06F 9/45533* (2013.01); *G06F 9/45558* (2013.01); *G06F 9/50* (2013.01); *G06N 5/022* (2013.01); *G06F 9/453* (2018.02); *G06F 2009/4557* (2013.01); *G06N 5/04* (2013.01); *G06Q 10/10* (2013.01)

(56) References Cited

U.S. PATENT DOCUMENTS

| | | | |
|---|---|---|---|
| 8,930,919 B2 * | 1/2015 | Bhaskara | G06F 8/76 717/137 |
| 9,055,002 B2 | 6/2015 | Lategan | |
| 9,841,966 B2 | 12/2017 | Alevoor | |
| 9,935,825 B2 | 4/2018 | Aswathanarayana | |
| 10,387,795 B1 * | 8/2019 | Oldridge | G06N 5/04 |
| 10,496,935 B2 | 12/2019 | Sachdev | |
| 10,579,342 B1 | 3/2020 | Shemer | |
| 11,176,464 B1 * | 11/2021 | Sagi | G06N 7/01 |
| 11,354,120 B1 * | 6/2022 | Zhang | G06F 8/72 |
| 11,467,828 B1 * | 10/2022 | Zhang | G06N 5/04 |
| 11,715,051 B1 * | 8/2023 | Baskaran | G06F 16/90335 707/758 |
| 2007/0245320 A1 | 10/2007 | Cotichini | |
| 2008/0209415 A1 | 8/2008 | Van Riel | |
| 2010/0058313 A1 | 3/2010 | Hansmann | |
| 2015/0020061 A1 | 1/2015 | Ravi | |
| 2016/0274893 A1 * | 9/2016 | Thomas | G06F 8/71 |
| 2016/0350146 A1 | 12/2016 | Udupi | |
| 2017/0034023 A1 | 2/2017 | Nickolov et al. | |
| 2017/0270432 A1 * | 9/2017 | Sachdev | G06Q 10/067 |
| 2018/0039956 A1 * | 2/2018 | McElhinney | G06Q 10/04 |
| 2018/0052898 A1 * | 2/2018 | Allan | G06F 16/2358 |
| 2019/0188774 A1 * | 6/2019 | Lehr | G06Q 10/0637 |
| 2020/0103877 A1 * | 4/2020 | Truong | G05B 19/41865 |
| 2020/0133653 A1 | 4/2020 | Johnson | |
| 2020/0259700 A1 | 8/2020 | Bhalla | |
| 2021/0034975 A1 * | 2/2021 | Luo | G06Q 30/0269 |
| 2021/0042720 A1 * | 2/2021 | Xin | H04L 67/535 |
| 2021/0357767 A1 * | 11/2021 | Fuerst | G06N 20/20 |
| 2021/0374241 A1 * | 12/2021 | Parikh | G06F 18/214 |
| 2021/0390422 A1 * | 12/2021 | Zhang | G06F 16/2358 |
| 2022/0038410 A1 * | 2/2022 | Bhargava | H04L 51/046 |
| 2022/0303175 A1 * | 9/2022 | Kunz | H04W 12/02 |

FOREIGN PATENT DOCUMENTS

| | | |
|---|---|---|
| JP | 2015-532991 A | 3/2016 |
| WO | 2014/051864 A1 | 4/2014 |

OTHER PUBLICATIONS

Puri et al., "Accelerate innovation with AI for app modernization—Journey to AI Blog", May 5, 2020, 2 pages, Grace Period Disclosure document.

Combined Search and Examination Report under Sections 17 & 18(3) received for GB patent Application Serial No. 2114739.2 dated Apr. 19, 2022, 11 pages.

Wilson, Rip "Introduction to NetApp Active IQ", NetApp, YouTube, Feb. 19, 2020, [online] Available from https://www.youtube.com/watch?v=wHaON79H_9w, accessed on Apr. 13, 2022, 2 pages.

Mayer, Marty "The New NetApp Active IQ Experience", NetApp, YouTube, Feb. 19, 2020, [online] Available from https://www.youtube.com/watch?v=494tzYEXBJY, accessed on Apr. 13, 2022, 2 pages.

Japan Patent Office, "Notice of Reasons for Refusal," Jan. 28, 2025, 6 Pages, JP Application No. 2021-174401.

* cited by examiner

ARTIFICIAL INTELLIGENCE BASED APPLICATION MODERNIZATION ADVISORY

BACKGROUND

The present invention relates generally to the field of artificial intelligence based applications, and more particularly to the updating, over time, of the same.

It is known that entities, like commercial companies, typically have computer systems, such as: (i) primarily on-premises computer systems with hardware components owned by the company that uses the computer system in their work; (ii) primarily off-premises computer systems (for example, a public cloud, a private cloud); and/or (iii) combinations of the foregoing two types. It is known that the entity that owns and/or controls a computer system will typically have the system "modernized" from time to time. Sometimes an entity may modernize its own computer system. In other cases, a "consumer entity" hires a third party (for example, a computer services company) to perform the modernization of the computer system of the consumer entity. This modernization typically includes replacing and/or repairing any component of a computer system with the objective of achieving better faster and/or more reliable performance in operations of the computer system; the computer system components subject to modernization include: hardware (for example, processor hardware, memory hardware, housing hardware, cooling system hardware, power transmission path hardware (for example, a computers power supply unit), signal transmission path hardware (for example, a bus), storage hardware, communication hardware (for example, modems, optical fiber lines, gateways), etc.), software (for example, style and/or of virtual machines used, style of containers used, cloud orchestration, communication protocols used, version/identity/configuration of software programs present and/or used in operations (for example, programs directed to end users, programs that control internal operations of the computer, operating system, etc.); and/or firmware.

SUMMARY

According to an aspect of the present invention, there is a method, computer program product and/or system that performs the following operations (not necessarily in the following order): (i) receiving an entity data set including information indicative of an entity's identity and a plurality of performance parameter values respectively relating to various parameters that measure performance of a computer system owned and/or controlled by the entity; and (ii) applying an artificial intelligence algorithm to the entity data set to obtain a first recommendation relating to modernization of the computer system.

DETAILED DESCRIPTION

Some embodiments of the present invention are directed to applying artificial intelligence to decide when to, and/or when not to, send a consumer of a computer system a communication recommending that the computer system be revised to include a more recent version of at least one of the following: a hardware component (for example, microprocessor(s)) and/or a software component (for example, an updated version of an app). The computer system, that is subject to modernization, may be owned outright by the consumer, or it may be purchased as a service (for example, infrastructure as a service, software as a service, package of cloud services). This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
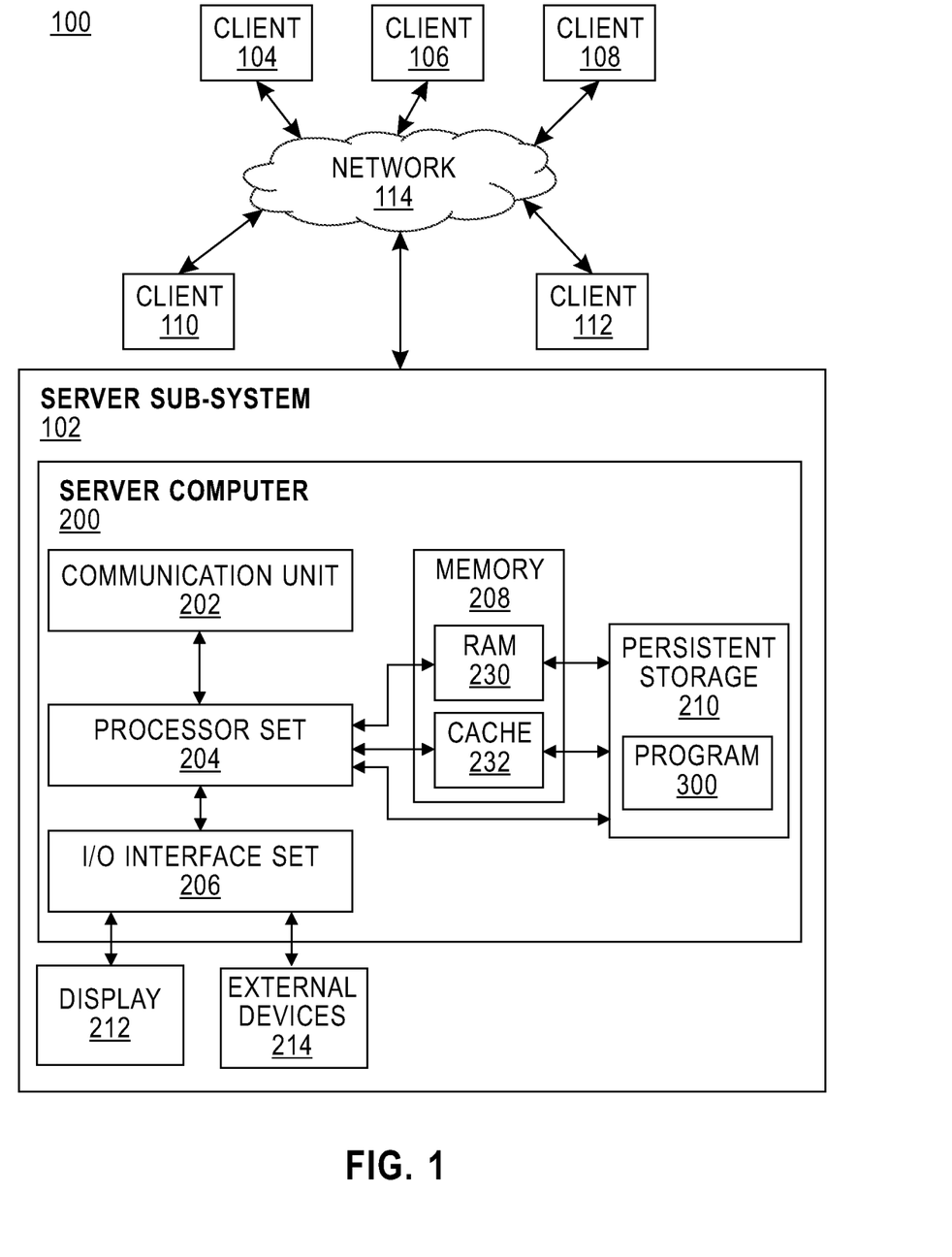
FIG. 1 is a block diagram of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
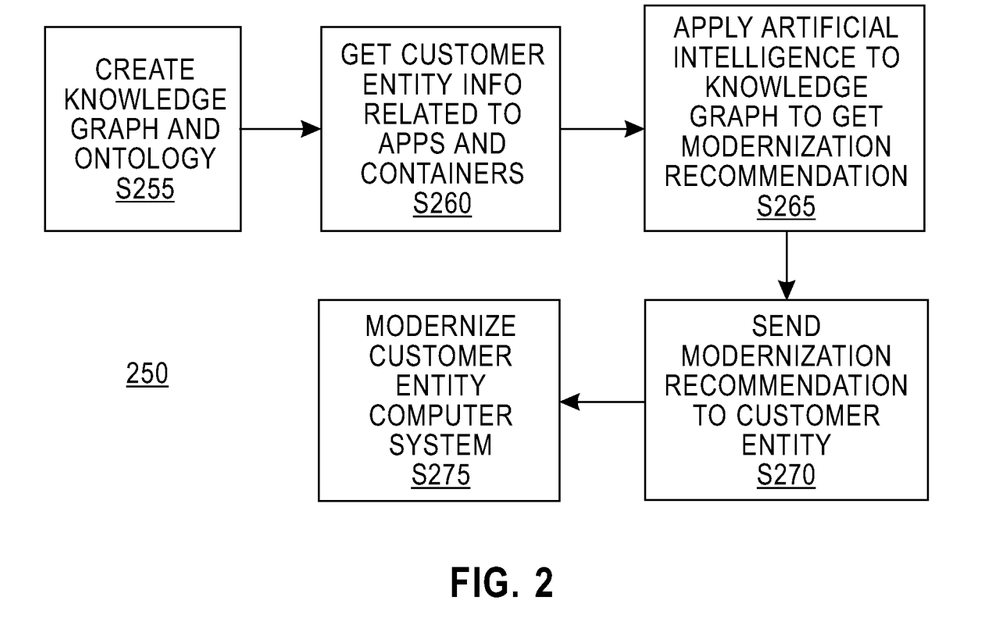
FIG. 2 is a flowchart showing a first embodiment method performed, at least in part, by the first embodiment system.
Figure 3:
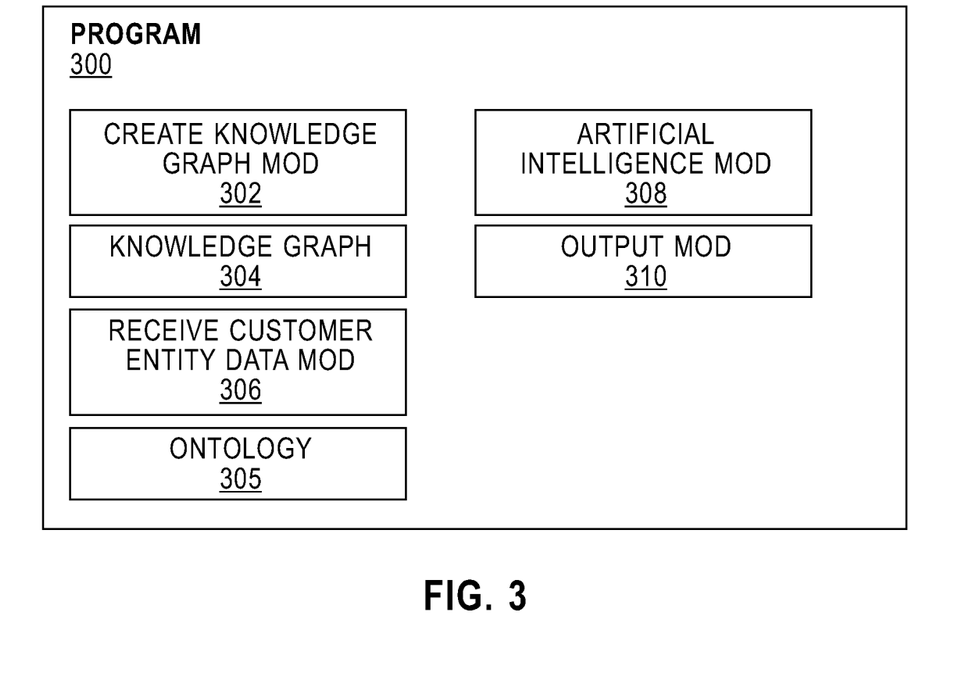
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where create knowledge graph module ("mod") 302 receives knowledge graph 304 and ontology 305. In various embodiments, the knowledge graph and ontology make take any form now known in the art or to be developed in the future. In general terms, the graph is constructed by collecting knowledge in the form of data, putting the knowledge into a set of discrete nodes to get the knowledge graph started, and also layer in connections among and between the nodes to complete the construction of the knowledge graph data structure of the knowledge graph data set.

Ontology 305 provides a graphical representation of data as concepts and relations between them. Some examples of concepts that may be used in various embodiments of the present invention are: operating system, application, database, middleware and so on. One example of a relation that may be used in various embodiments of the present invention is as follows: an application "runs on" an operating system (that is, "runs on" is a relation between a particular application and a particular operating system upon which the specific application runs). As will be further explained in the following paragraph, an ontology can also be represented as a type of data structure which is known by those of skill in the art as a "knowledge graph," where: (i) each concept of the ontology is represented as a type of data set called a "node;" and (ii) each relation of the ontology is represented as a type of data structure variously known by those of skill in the art as a "connection" or an "edge."

Figure 4:
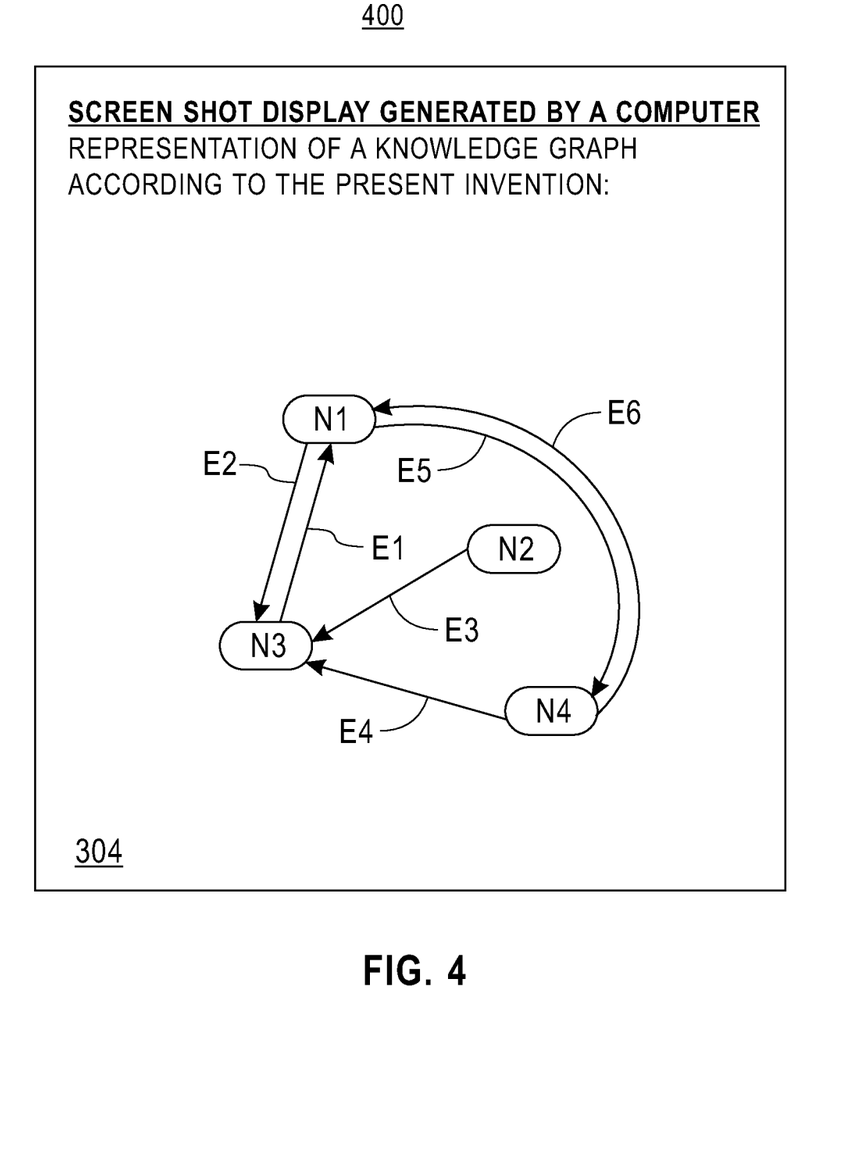
FIG. 4 is a screenshot view generated by the first embodiment system.

As shown in FIG. 4, screen shot 400 shows knowledge graph 304, which includes: (i) multiple nodes (N1, N2, N3, N4); and (ii) multiple edges (E1, E2, E3, E4, E5, E6). Each of the nodes of the knowledge graph is a set of computer readable data that corresponds to a technological concept such as OS (operating system), Application Server, Web Server, Database. Each of the edges of the knowledge graph is a set of computer readable data that corresponds to relation between the nodes, which typically includes a compatibility constraint between the nodes. For example, a web server such as (Internet Information Services) IIS "runs on" on an OS such as Windows where "runs on" is a compatibility constraint between the nodes: IIS and Windows.

Processing proceeds to operation S260, where receive customer entity mod 306 receives a set of data corresponding to a customer entity's (for example, a commercial corporation's) operation and use of the hardware and/or software of its computer system. In this example, this customer entity data set is sent from client sub-system 104 (that is, the customer entity's on premise portion of its computer system) and over communication network 114. The customer entity's on-premises computer system is the block labelled client subsystem 104 in FIG. 1, and is made up primarily of physical computers (and software running on them) owned and controlled by the customer entity. In this example, a supplier owns and controls server sub-system 102 and client sub-system 106 (which, in this example, is made up primarily of a public cloud). The customer entity purchases services, which are performed on client sub-system 106. Generally speaking, when a customer entity has a "computer system," then the "computer system of the customer entity" may include one, or more of the following: (i) hardware on customer entity's premises; (ii) software and firmware running on the customer entities premises; (iii) hardware of supplier entity(ies) that provide computer services (for example, cloud computing services) to the customer entity; and/or (iv) software of supplier entity(ies) that provide computer services (for example, cloud computing services) to the customer entity. In this example, the customer entity's computer system spans all four (4) of the foregoing types.

Generally speaking, the customer entity data set includes data regarding at least one aspect of the functioning, operation and/or health of the customer entity's computer system. In this example, the customer entity data set includes information regarding four aspects of the operation of the customer entity's computer system: (i) performance of its platforms; (ii) performance of its factoring configuration; (iii) performance of its package(s); and (iv) performance of its virtual computing environments (that is, its containers and/or virtual machines).

Processing proceeds to operation S265 where artificial intelligence mod 308 is applied to the following inputs: (i) the customer entity data set; (ii) knowledge graph 304; and (iii) ontology 305. In this example, the modernization recommendations are directed to a particular aspect of the customer's computer system—specifically, "application modernization," which means modernization of an "application" (typically a set of computer code denominated as a "computer program"). An application that is a candidate for application modernization can have multiple components such as database, middleware, application server and/or programming languages. In this example, the recommendations are directed to and designed for situations where the customer entity needs to understand how each component of its application(s) can be modernized with respect to available containers (or other virtual computing environment).

To further explain the nature of the application, which is a candidate for modernization in this example, it is a virtual environment orchestration application. As the term is used herein, "virtual environment orchestration applications" are applications that include functionality to allocate incoming computing workloads among and between container instances and/or virtual machine instances. In this example, the customer's virtual environment orchestration application includes eleven (11) aspects (these eleven aspects are listed in the following sub-section of this Detailed Description section). The following sub-section of this Detailed Description section will focus on discussion of embodiment(s) where artificial intelligence is used to generate modernization recommendations specifically for modernizing virtual environment orchestration applications that perform virtual environment orchestration (for example, orchestration of workloads with containers).

In this example, mod 308 is designed to output four recommendations regarding the cloud orchestration aspect of the customer's computer system as follows: (i) modernize, or, alternatively, keep, the current virtual computing environment (for example, containers) related services; (ii) re-factor, or, alternatively, keep, the current factoring configuration; (iii) modernize, or, alternatively, keep, the current packaging; and (iv) modernize, or, alternatively, keep, the current computing platform(s). Alternatively, other systems may make other types of recommendations related to system modernization. For example, mod 308 may recommend modernization of the current virtual computing environment due to its age and/or because the virtual computing environment is incompatible with recently released types of virtual machines and/or containers. In this example, the modernization recommendations for the virtual environment orchestration application aspect of the customer's computer system are achieved by artificial intelligence machine logic (for example, software) that makes the recommendations based on various types of historical data (such as, instances of relatively successful and relatively unsuccessful modernizations that have been made in the past on the customer's computer system and/or other computer systems that bear at least some similarity (preferably a high degree of similarity) to the current customer's computer system and its virtual environment orchestration application code and/or the configuration(s) to be set in the virtual environment orchestration application. Some embodiment(s) of artificial intelligence machine logic adapted to make modernization recommendations with respect to virtual environment orchestration applications will be discussed in the following sub-section of this Detailed Description section.

Processing proceeds to operation S270, where output mode 310 sends the four recommendations to the appropriate individual(s) at the consumer entity (that is, client subsystem 104). In this example, the recommendations are sent in human understandable form and format by a text message. In this example, the individual(s) receive all four recommendations whether the recommendations are of the "modernize" type or the "keep" type. Alternatively, the customer entity may only want communications that require active participation to implement (generally, only the modernize type recommendations). In some embodiments, the recommendation to modernize may automatically cause the modernization to be performed and implemented without the need for any substantial human intervention. In this embodiment, the modernize type recommendations are general and not specific—meaning that the recommendations don't include any information on the details of the recommended modernization. Alternatively, the recommendations can include details on topics such as the following: what specifications and/or resources to modernize; the identities of recommended computing services and/or programs and/or app; how to do the modernization; when the modernization is recommended; and/or why the modernization is recommended.

Processing proceeds to operation S275, where the customer entity modernizes its computer system in light of the recommendations received at operation S270. In this example, the modernizations include the following four types of modernization: (i) re-factor; (ii) re-package; (iii) re-platform; and (iv) modernize virtual computing environments (VCEs) and/or computer program(s) to control VCEs.

III. Further Comments and/or Embodiments

Some embodiments of the present invention recognize one, or more, of the following facts, potential problems and/or potential areas for improvement with respect to the current state of the art: (i) a typical enterprise has a legacy application portfolio that is deployed and updated over time across a wide range of IT (information technology) infrastructure and services; (ii) when an enterprise moves its applications to the cloud, the enterprise may encounter the following challenges: (a) application portfolio data are incomplete, inconsistent and presented in non-standard formats (spreadsheets, CMDB (configuration management database), log, etc.), and (b) it takes significant (months) human efforts for SME (small/medium enterprise entities) to catalog and standardize their application and technology portfolio for analysis; (iii) existing application disposition recommendation for application portfolios are largely rule-based, rather than data-driven and rooted in analyzing the specific application technologies; (iv) deployment composition and units, as well as transformation complexity, can be introduced by variants and version incompatibilities; (v) there are no existing models in predicting complexity, effort sizing and risk of transformation of an application portfolio; and/or (vi) such models may include critical business metrics to drive forward transformation budgeting and project sizing for enterprises.

Some embodiments of the present invention may include one, or more, of the following operations, features, characteristics and/or advantages: (i) a method and system to provide AI-based application modernization advisory; and/or (ii) ingests application related data from multiple sources and, based, at least in part, upon this data, provides appropriate advisory(ies) for modernizing an application.

A method according to an embodiment of the present invention includes the following operations (not necessarily in the following order): (i) ingest application related data (raw data) from multiple sources such as application source code, CMDB/discovery related data, incident and change tickets, SME responses to pre-defined questionnaires; (ii) ingest data from external services related application such as ADDI (Application Discovery and Delivery Intelligence); (iii) based on the input data, perform pre-processing to sanitize and normalize the data; (iv) once the data is normalized and sanitized, perform AI-based information extraction (for example from text data, responses from SMEs and discovery data) including: (a) perform entity and relationship extraction, (b) using natural language understanding software and/or hardware for natural language text inputs, and (c) performing source code analysis to extract data dependencies and call relationships; (v) perform data curation to impute missing information to create a complete technology stack for the applications; (vi) based on different forms of data, training a set of recommendation algorithms; (vii) for example one of the recommendation algorithm recommends whether an application should be containerized, refactored, re-platformed, and subjected to any other processes typically performed on containers controlled by a cloud orchestration application (see description of cloud orchestration application in the previous sub-section of this Detailed Description section); (vii) another algorithm can provide further insights into containerization aspects, that is, to what extent an application can be containerized, associated challenges, complexity and risk; and (viii) based on the success of the algorithms, generate a data lake to store anonymized and processed data from an evaluated application (such data would help to improve recommendation of the algorithms).

Some embodiments of the present invention may include one, or more, of the following operations, features, characteristics and/or advantages: (i) ingest application related data and provide recommendation for modernization; (ii) create and maintain a data pipeline that takes data from multiple sources such as tickets, source code, responses to questionnaires, discovery data as input, standardizes the data, performs data curation and imputation of missing information; (iii) from the data pipeline, provide multiple recommendation algorithms to application modernization; and/or (iv) learn insights from the data and store them in a data lake with anonymization to improve existing algorithms.

Some embodiments of the present invention may include one, or more, of the following operations, features, characteristics and/or advantages: (i) an AI-assisted and automated method to ingest ad hoc application portfolio data from multiple sources (for example, CMDB, spreadsheet, SME survey, etc.); (ii) for the ingested ad hoc application portfolio data, provide auto-curation, data standardization and imputation; and/or (iii) application modernization disposition based on technology compatibility/complexity and business requirements.

A method according to an embodiment of the present invention includes the following operations (not necessarily in the following order): (i) ingest application raw ingested data from multiple sources (for example, CMDB/discovery related data, SME survey, pre-defined questionnaires, spreadsheet inventory, etc.); (ii) based on the raw ingested data, perform auto-curation, data standardization and imputation to a standard ontology to obtain processed data; (iii) automatically learn the accompanying knowledge base, covering diverse set of technologies, such as platforms, middleware, runtime, programming languages, libraries, and/or applications/database; (iv) based on the processed data, perform entity and relationship extraction using NER (named entity recognition) and multi-label classifications (note: the technique is specialized to work well with IT named entities without assuming sequential constraints; (v) apply a technology knowledge graph and ontology onto the standardized application portfolio to automatically reason about the feasibility and complexity of containerization of each application deployment unit, including reason through compatibility of the technology versions and variants); and (vi) take containerization analysis and business requirements in consideration to arrive at application modernization disposition and effort sizing (for example, the kind of modernization disposition and effort sizing that an SME would perform manually today). In some embodiments, the entire approach is data driven and supports high explanation: Keep, Containerize, Re-platform/Re-package, and Refactor.

Some embodiments of the present invention may include one, or more, of the following operations, features, characteristics and/or advantages: (i) auto-curation, data standardization and imputation to a standard ontology; (ii) automatically learning the accompanying knowledge base, covering diverse set of technologies, such as platforms, middleware, runtime, programming languages, libraries, and applications/database; (iii) performing entity and relationship extraction using NER and multi-label classifications; (iv) automatically reasoning about the feasibility and complexity of containerize each application deployment unit, including reason through compatibility of the technology versions and variants; and/or (iv) using a combination of containerization analysis and business requirements to recommend modernization disposition and effort sizing.

Some embodiments provide an AI-assisted and automated method to ingest ad hoc application portfolio data from multiple sources (for example, CMDB, spreadsheet, SME survey, etc.) and provide auto-curation, data standardization and imputation. Also, some embodiments provide application modernization disposition based on technology compatibility/complexity and business requirements.

Five (5) features that are present in some embodiments of the present invention will be respectively explained in the following five (5) paragraphs.

Data Ingestion: machine logic ingests application portfolio data (raw data) from multiple sources such as CMDB/discovery related data, SME survey to pre-defined questionnaires, spreadsheet inventory, etc.

Knowledge Learning: Based on the input data machine logic performs auto-curation, data standardization and imputation to a standard ontology and automatically learn the accompanying knowledge base, covering diverse set of technologies, such as platforms (Mainframe, Linux, Windows, etc.), middleware (for example, IIS (Internet information system), Tomcat, etc.), runtime (.NET, ASP, etc.), programming languages, libraries, and applications/database.

Named-entity recognition: Once the data is normalized and sanitized, machine logic performs entity and relationship extraction using NER and multi-label classifications. This technique is specialized to work well with IT (information technology) named entities without assuming sequential constraints.

Containerization Assessment: application of a technology knowledge graph and ontology onto the standardized application portfolio and automatically reason about the feasibility and complexity of containerize each application deployment unit, including reason through compatibility of the technology versions and variants.

Disposition and Explanation: machine logic takes containerization analysis and business requirements in consideration to arrive at application modernization disposition and effort sizing, like an SME would perform manually today. The entire approach is data driven and supports high explanation.

Some embodiments of the present invention may include one, or more, of the following operations, features, characteristics and/or advantages: (i) performs auto-curation, data standardization and imputation to a standard ontology; (ii) automatically learns the accompanying knowledge base; (iii) covers a diverse set of technologies, such as platforms, middleware, runtime, programming languages, libraries, and applications/database; (iv) performs entity and relationship extraction using NER and multi-label classifications; (v) automatically calculates and determines the feasibility and complexity of containerizing each application deployment unit, including calculations accounting for compatibility of the technology versions and variants; (vi) uses a combination of containerization analysis and business requirements to recommend modernization disposition and effort sizing; (vii) implements auto-curation, data standardization, imputation and entity relationship extraction techniques like, NER and multi-label classification models to automatically extract technologies, such as platforms, middleware, runtime, programming languages, libraries, and applications/database from unstructured data; (viii) implements algorithms to automatically reason about the feasibility and complexity of containerization of different deployment units of each application and reasoning through compatibility of the technology versions and variants; and (ix) implements models to recommend modernization disposition and effort sizing based on above containerization analysis and business requirements.

Figure 5:
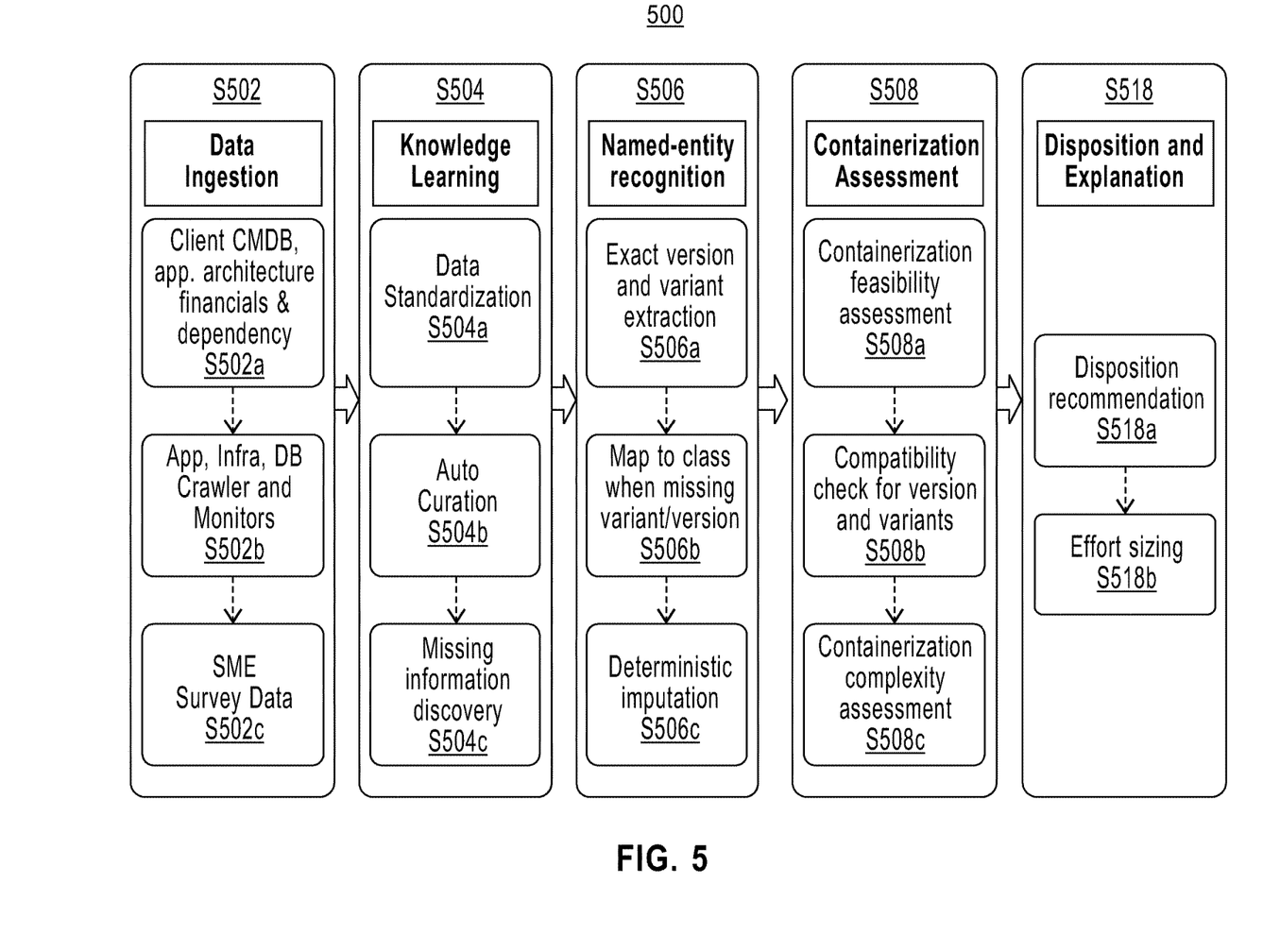
FIG. 5 is a diagram helpful in understanding a second embodiment of a computer system according to the present invention.

Flowchart 500 of FIG. 5 represents a method of application modernization according to an embodiment of the present invention. Flowchart 500 includes the following operations (with process flow among and between the operations being as shown by the arrows in FIG. 5): S502 (including sub-operations S502a, S502b and S502c); S504 (including sub-operations S504a, S504b and S504c); S506 (including sub-operations S506a, S506b and S506c); S508 (including sub-operations S508a, S508b and S508c); and S518 (including sub-operations S518a and S518b). All the operations are written using Python Programming Language and deployed using a Linux based container. The operations can be installed on a Linux VM or on a Linux based blade server. The container provides all pre-requisites such as Python libraries to support the execution of the operations. The Linux VM or Blade Server would require user to pre-install them before running the operations.

In FIG. 5, the data ingestion refers to different data such as client CMDB (see S502a), application workload such as its infrastructure where it is deployed (see S502b), and SME survey data collected from clients regarding their applications (S502c). In the knowledge learning step, a containerization advisor (sometimes herein referred to as "ACA") performs the data standardization of the application workload (see S504a) and note that .net or DOT NET is standardized as .NET Framework. The ACA does the auto curation of application components (see S504b), which is to say that it extracts components such as database, middleware and other related information from application workload. As will be appreciated by those of skill in the art, missing information discovery operation 504c is performed similarly to the manner in which this operation is performed in currently conventional computer systems, and is not particularly relevant to the various embodiments of the present invention.

The ACA performs the data (entity) standardization using a natural language processing technique "Named-entity recognition" where it recommends the exact version and the variant from an input. For example, for an input red hat v6.9 ACA can infer the variant as Red Hat Linux and its version as 6.9, respectively (see S506a). ACA handles the missing variant or the version using KG based reasoning (see S506b). The ACA handles missing input(s) through deterministic reasoning based on compatible rules (see S506c). For example, for a given application input .NET Framework, ACA using KG based reasoning can infer the OS for the application to be Windows. The ACA provides containerization assessment in terms of recommending the best possible container to modernize a given workload (see 508*a*) and additional complexity of containerization (that is, how difficult it is to containerize an application workload) (see S508C). The containerization complexity determined based on the difference between variants and versions of an incoming application and containers recommended for the application (see S508*b*). The ACA recommends the disposition for an application workload whether it needs to be containerized, refactored, repackaged, or kept as it is (see S518*a*). Finally, the ACA provides the effort estimation in terms of the number of people per week to move a legacy application workload to the recommended disposition (see S518*b*).

Figure 6:
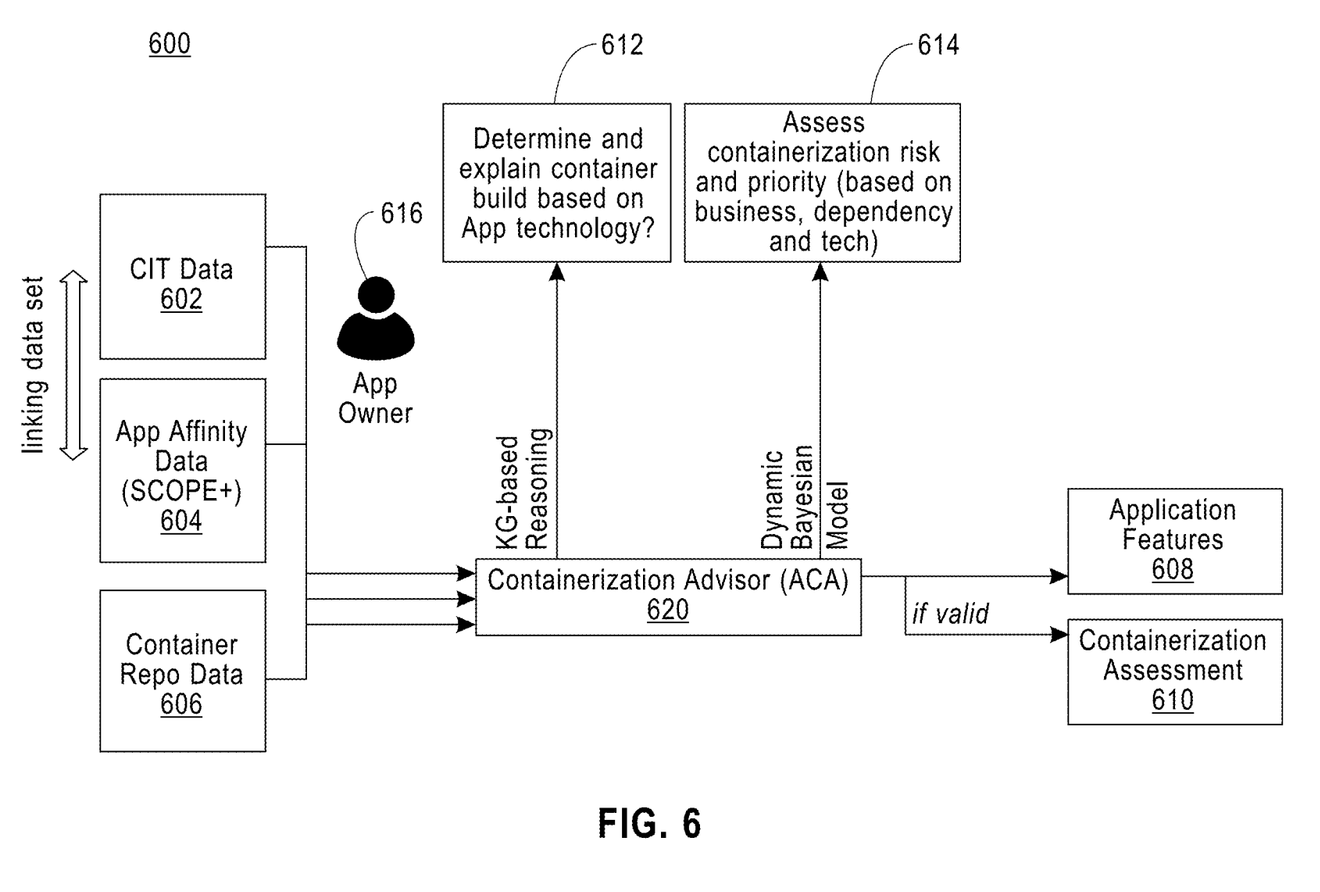
FIG. 6 is another diagram helpful in understanding the second embodiment system.

As shown in FIG. 6, automatic data curation diagram 600 includes: IBM's CIT (cloud innovation toolkit) data block 602; app affinity data (scope+) block 604; container repo data block 606; application features block 608; containerization assessment block 610; determine and explain block 612; assess containerization risk block 614; app owner 616; and containerization advisor (ACA) block 620. All the operations in FIG. 6 are written using Python Programming Language and deployed using a Linux based container. The operations can be installed on a Linux VM or on a Linux based blade server. The container provides all pre-requisites such as Python libraries to support the execution of the operations. The Linux VM or Blade Server would require user to pre-install them before running the operations.

CIT data block 602 includes the following types of data: App Name, App Description, Platform and Version, Tech Summary, Programming Languages, Middleware, Integration Services, Business Critical, Internet Facing and Client Facing.

App affinity data (scope+) block 604 includes the following types of data: App Inst Relations, App Inst business domain, App size, Number of Defects per Year, Frequency of Change, Business Strategic Value, Business SaaS (software as a service) Availability, Business Agility Benefits, Business Process Area, Data Residency Requirements, Data transfer Requirements, Scalability and Elasticity Requirements, SLAs (service level agreements) and SLOs (service level objectives), Stateless, App Inst type, Relationship type, Relationship Status, and Current Lifecycle.

Container repo data block 606 includes the following types of data: Container Name, Container Description, Container Version, Container Org & URL (uniform resource locator), and OS (operating system) and Platform.

Application features block 608 includes the following: App Name, App Description, Platform and OS, Programming Languages, Middleware, Dependent Applications, Business Criticality, Complexity and Data Validation Errors.

Containerization assessment block 610 includes the following: App Image Name, App Description, Platform and OS, Programming Languages, Middleware, Dependent Applications, Business Criticality, Complexity, Confidence, Reference Docker Images, and Containerization Issues.

Diagram 600 represents collection of application data including the infrastructure details where such applications are deployed from various sources such as a commercially available CIT tool 602 and scope+ block 604. Container repo data block 606 contains details on Docker Hub images that are later used to map to legacy application data for generating containerization assessment.

In this example, containerization advisor (ACA) block 620 includes the following three (3) functionalities: (i) performs a cloud orchestration application assessment to standardize and validate raw inputs, (ii) handles missing inputs, and (iii) recommends containerization planning along with explainability (see block 612). For validation, block 620 uses knowledge graph (KG) based reasoning. The reasoning is done on the basis of compatibility constraints captured between concepts based on their relations. Two, block 620 assesses containerization risk (see block 614) based on several factors such as its dependency with other components, and whether everything can be containerized or not. For the risk computation, block 620 uses a dynamic Bayesian model. Three, block 620 generates the containerization assessment (see block 610) for a valid application (see block 612). Four, block 620 also provides the application features that lead to the containerization assessment (see block 608).

In some embodiments, the ontology for a legacy application includes eleven (11) modernization aspects (modernization aspects may sometimes be referred to herein as "concepts"): hardware (HW), storage, OS, Application server/Middleware (App Server/MW), Runtime, Application/Middleware/Database (App/MW/DB), Runlib, Library and Programming Language (Lang). Other embodiments may include more, or fewer In addition to concepts, in this particular example, the ontology has 4 relation types (that is, types of connections, or edges, that may exist among and between various nodes of the ontology): has, supports, runs on, and dependency. When a client provides an application workload as an input, ACA standardizes the components in the workload to map to such concepts in the ontology for the legacy applications. Further, using such concepts and relations, ACA defines several compatibility constraints created as Whitelist and Blacklist rules to handle missing inputs and validates the workload. Once the workload is validated, ACA generates a containerization plan based the docker ontology on the right-hand side. The docker ontology has 3 concepts: Docker image, HW, and storage. The docker ontology has 3 relations: has, runs on, and dependency. Each Docker image has the same set of concepts a legacy application workload has. Based on a given application workload, ACA matches the identified concepts from the application workload and discovers a best possible docker image that has one or more related concepts. For example, consider an application workload such as Linux, DB2. The workload is matched with a DB2 docker image that has Linux as the OS and DB2 as the Application/Middleware/Database.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    receiving, by a system operatively coupled to a processor, an entity data set including information indicative of an identity of an entity and a plurality of performance parameter values respectively relating to various parameters that measure performance of a computer system owned or controlled by the entity;
    identifying, by the system, a second computer system that is distinct from the computer system but bears a defined level of similarity to the computer system,
        and wherein the second computer system is associated with a second entity, the computer system is associated with the entity and the second entity is distinct from the entity;
    applying, by the system, an artificial intelligence algorithm to the entity data set and to data regarding successful or unsuccessful modernizations performed previously on the second computer system associated with the second entity; and
    generating, by the system, a recommendation relating to modernization of the computer system based on the applying the artificial intelligence algorithm to the entity data set and to the data regarding successful or unsuccessful modernizations performed previously on the second computer system associated with a second entity, and to provide insights into containerization aspects including to what extent the application can be containerized and complexity of application containerization, wherein the complexity is determined by:
        applying a technology knowledge graph and ontology onto a portfolio of the application to automatically reason about feasibility and the complexity of containerization of each application deployment unit, including reasoning through compatibility of technology versions and variants to cause the computer system to take steps to automatically modernize the computer system in accordance with the recommendation and the provided insights.

2. The computer-implemented method of claim 1, further comprising:
    sending, by the system, over a computer network, the recommendation to the computer system, wherein the computer system is associated with the entity; and
    controlling the computer system, by the system, and based on the recommendation, to cause the computer system to take steps to automatically modernize the computer system in accordance with the recommendation.

3. The computer-implemented method of claim 1, further comprising:
    receiving, by the system, a knowledge graph, wherein the applying the artificial intelligence algorithm comprises employing the knowledge graph by the artificial intelligence algorithm, wherein an ontology is represented as a type of data structure that is the knowledge graph, wherein each concept of the ontology is represented as a type of data set called a node and each relation of the ontology is represented as a type of data structure known as a connection or edge.

4. The computer-implemented method of claim 1, further comprising:
    receiving, by the system, an ontology, wherein the applying the artificial intelligence algorithm comprises employing the ontology by the artificial intelligence algorithm, and wherein the ontology comprises a graphical representation of data as concepts and relations between the concepts.

5. The computer-implemented method of claim 1, wherein the recommendation is a recommendation to re-package or re-platform at least a portion of the computer system of the entity.

6. The computer-implemented method of claim 1, wherein the recommendation is a recommendation to re-factor at least a portion of the computer system of the entity.

7. The computer-implemented method of claim 1, wherein the recommendation is a recommendation to modernize the virtual computing environment used in the computer system of the entity.

8. The computer-implemented method of claim 1, wherein the recommendation relating to modernization of the computer system is directed to a potential modernization recommendation for an application that runs on the computer system.

9. The computer-implemented method of claim 8, wherein the application is a virtual environment orchestration application that includes functionality to allocate incoming computing workloads among and between container instances or virtual machine instances running on the computer system.

10. A computer program product comprising:
    one or more storage devices with each of the one or more storage devices including a non-transitory storage medium; and
    computer code collectively stored on the one or more storage devices, with the computer code including data and instructions for causing a processor to perform the following operations:
        receipt, by the processor, of an entity data set including information indicative of an identity of an entity and a plurality of performance parameter values respectively relating to various parameters that measure performance of a computer system owned or controlled by the entity;
        application, by the processor, of an artificial intelligence algorithm to the entity data set to obtain a recommendation regarding containerization relating to modernization of the computer system, and to provide insights into containerization aspects including to what extent the application can be containerized and complexity of application containerization, wherein the complexity is determined by:
            applying a technology knowledge graph and ontology onto a portfolio of the application to automatically reason about feasibility and the complexity of containerization of each application deployment unit, including reasoning through compatibility of technology versions and variants; and
        controlling the computer system, by the processor, based on the recommendation, to cause the computer system to take steps to automatically modernize the computer system in accordance with the recommendation and the provided insights.

11. The computer program product of claim 10, wherein the computer code further includes data and instructions for causing the processor to perform the following further operations:
   a sending, by the processor, of the recommendation and the provided insights to the entity.

12. The computer program product of claim 10, wherein the computer code further includes data and instructions for causing the processor to perform the following further operations:
   receipt, by the processor, of a knowledge graph, wherein the application of the artificial intelligence algorithm comprises employing of the knowledge graph by the artificial intelligence algorithm, wherein an ontology is represented as a type of data structure that is the knowledge graph, wherein each concept of the ontology is represented as a type of data set called a node and each relation of the ontology is represented as a type of data structure known as a connection or edge.

13. The computer program product of claim 10, wherein the computer code further includes data and instructions for causing the processor set to perform the following further operations:
   receipt, by the processor, of an ontology, wherein the application of the artificial intelligence algorithm comprises employment of ontology by the artificial intelligence algorithm, and wherein the ontology comprises a graphical representation of data as concepts and relations between the concepts.

14. The computer program product of claim 10, wherein the recommendation is a recommendation to also re-package or re-platform at least a portion of the computer system of the entity.

15. The computer program product of claim 10, wherein the first recommendation is a recommendation to also re-factor at least a portion of the computer system of the entity.

16. The computer program product of claim 10, wherein the recommendation relating to modernization of the computer system is directed to a potential modernization recommendation for an application that runs on the computer system and wherein the application is a virtual environment orchestration application that includes functionality to allocate incoming computing workloads among and between container instances or virtual machine instances running on the computer system.

17. A computer system comprising:
   one or more storage devices with each storage device including a storage medium;
   a processor; and
   computer code collectively stored on the one or more storage devices, with the computer code including data and instructions for causing the processor to perform the following operations:
      receipt of an entity data set including information indicative of an identity of an entity and a plurality of performance parameter values respectively relating to various parameters that measure performance of a computer system owned or controlled by the entity;
      a training of a plurality of recommendation algorithms based on a plurality of different forms of data comprised within the entity data set; and
      application of an artificial intelligence algorithm to the entity data set to obtain a recommendation relating to modernization of the computer system, wherein the recommendation is a selection between the set of options consisting of: containerization, refactorization and generating a re-platform relative to an application of the computer system, and to provide insights into containerization aspects including to what extent the application can be containerized and complexity of application containerization, wherein the complexity is determined by:
      automatically calculating and determining feasibility and the complexity of containerizing each application deployment unit, including calculations accounting for compatibility of technology versions and variants to cause the computer system to take steps to automatically modernize the computer system in accordance with the recommendation and the provided insights.

18. The computer system of claim 17, wherein the recommendation relating to modernization of the computer system is directed to potential modernization recommendation for an application that runs on the computer system, and wherein the application is a virtual environment orchestration application that includes functionality to allocate incoming computing workloads among and between container instances or virtual machine instances running on the computer system.

19. The computer system of claim 17, wherein the computer code also includes data and instructions for causing the processor to perform the following operations:
   generation of a data lake stored on the storage medium and storing anonymized and processed data from an evaluated application of the computer system, wherein the storage of the data lake improves the training of the plurality of recommendation artificial intelligence algorithms or improves the recommendation relating to the modernization of the computer system.

* * * * *